(12) United States Patent
Zhang et al.

(10) Patent No.: US 7,889,902 B2
(45) Date of Patent: Feb. 15, 2011

(54) HIGH QUALITY VOLUME RENDERING WITH GRAPHICS PROCESSING UNIT

(75) Inventors: Hui Zhang, Sunnyvale, CA (US); Bai Wang, Palo Alto, CA (US); Dongshan Fu, Santa Clara, CA (US)

(73) Assignee: Accuray Incorporated, Sunnyvale, CA (US)

( * ) Notice: Subject to any disclaimer, the term of this patent is extended or adjusted under 35 U.S.C. 154(b) by 904 days.

(21) Appl. No.: 11/821,996

(22) Filed: Jun. 25, 2007

(65) Prior Publication Data

US 2008/0317321 A1 Dec. 25, 2008

(51) Int. Cl.
*G06K 9/00* (2006.01)
*G06F 15/16* (2006.01)

(52) U.S. Cl. .................................. 382/128; 345/502

(58) Field of Classification Search ................. 382/128, 382/129, 130, 131, 132, 133, 134, 171, 173; 378/4, 8, 21–27, 101, 901; 600/407, 410, 600/425, 442; 345/24, 502, 503, 522, 530; 128/920, 922

See application file for complete search history.

(56) References Cited

U.S. PATENT DOCUMENTS 7,330,578 B2   2/2008   Wang et al.
7,639,866 B2 * 12/2009   Pomero et al. .............. 382/154
7,747,055 B1 *  6/2010   Vining et al. ............... 382/131
2006/0072821 A1  4/2006  Wang
2006/0291710 A1 12/2006  Wang et al.

OTHER PUBLICATIONS

Levoy, Marc, et al., "*Volume Rendering in Radiation Treatment Planning*", Proc. 1$^{st}$ Conf. Visualization in Biomedical Computing, IEEE CS Press, 1990, pp. 4-10.
Westermann, Rüdiger, et al., "*Efficiently Using Graphics Hardware in Volume Rendering Applications*", [Computer Graphics Group, Universität Erlangen-Nürnberg, Germany], Proc. of SIGGRAPH, Comp. Graph. Conf. Series, 1998.

(Continued)

*Primary Examiner*—Abolfazl Tabatabai
(74) *Attorney, Agent, or Firm*—Blakely, Sokoloff, Taylor & Zafman LLP (57) ABSTRACT

A technique for generating DRR (digitally reconstructed radiography) images includes dividing sample points along a ray trajectory through a 3-dimensional dataset of attenuation values into stages. Each of the stages includes a plurality of the sample points. The attenuation values are summed along the ray trajectory for each of the sample points. Intermediate summation values are computed for each of the stages along the ray trajectory and for each of the stages the attenuation values summed within a given stage are summed with a previous stage intermediate summation value calculated for a stage previous to the given stage to generate a given stage intermediate summation value. A final accumulation value being representative of a total attenuation summed along the ray trajectory is calculated.

50 Claims, 8 Drawing Sheets

OTHER PUBLICATIONS

Engel, Klaus, et al., "*High-Quality Pre-Integrated Volume Rendering Using Hardware-Accelerated Pixel Shading*", [Visualization and Interactive Group, University of Stuttgart, Germany], Eurographics/SIGGRAPH Workshop on Graphics Hardware, Aug. 2001.

Engel, Klaus, et al., "*High-Quality Pre-Integrated Volume Rendering Using Hardware-Accelerated Pixel Shading*", Visualization and Interactive Group, University of Stuttgart, Germany, (9 pages).

Hesser, Jürgen, et al., "*Three Architectures for Volume Rendering*", Eurographics '95, vol. 14, No. 3, Blackwell Publishers, 1995, (1 page).

Levoy, Marc, et al., "*Volume Rendering a Radiation Treatment Planning*", (5 pages).

Pawasauskas, John, "*Volume Visualization With Ray Casting*", CS563—Advanced Topics in Computer Graphics, Feb. 18, 1997, (15 pages) http://web.cs.wpi.edu/~matt/courses/cs563/talks/powwie/p1/ray-cast.htm, accessed Apr. 16, 2007.

Vollrath, Joachim E., et al., "*A Generic Software Framework for the GPU Volume Rendering Pipeline*", VMV 2005, Erlangen, Germany, Nov. 16-18, 2005 (9 pages).

Westermann, Rüdiger, et al., "*Efficiently Using Graphics Hardware in Volume Rendering Applications*", Computer Graphicds Group, Universität Erlangen-Nürnberg, Germany, (9 pages).

Wikipedia, "*Framebuffer Object*", http://en.wikipedia.org/wiki/Framebuffer_Object, accessed Apr. 16, 2007, pp. 1-2.

Wikipedia, "*Volume Rendering*", http://en.wikipedia.org/wiki/Volume_rendering, pp. 1-4, accessed Apr. 22, 2007, (2 pages).

\* cited by examiner

HIGH QUALITY VOLUME RENDERING WITH GRAPHICS PROCESSING UNIT

TECHNICAL FIELD

This disclosure relates generally to volume rendering, and in particular but not exclusively, relates to generation of digitally reconstructed radiographs ("DRR") using a graphics processing unit ("GPU") pipeline.

BACKGROUND

Image registration techniques may be used in a medical field to relate a pre-operative image of a patient's anatomy to a near real time image of the patient during actual treatment. During radiosurgery, for example, changes in target position at the time of treatment, as compared to its position at the time of the diagnostic treatment planning, may be detected. This may be accomplished by registering the 2D image acquired at a treatment time with the 3D scan data obtained at the time of treatment planning. A robust and accurate 2D-3D image registration algorithm may enable the position of the target, as viewed in the real-time 2D image, to be properly correlated with the pre-operative 3D scan. In practice, a formal mathematical transformation may be derived that best aligns the pre-operative image coordinate system with the patient's physical world coordinate system, defined for example in the treatment room.

Fiducial markers may be attached to or implanted within a patient before the pre-operative images are acquired, in order to accomplish a point-based alignment of the different coordinate systems. These fiducial markers are typically designed so that they can be localized relatively accurately in the pre-operative image, as well as in the real physical world. The respective localization points may then be used to calculate a rigid body transformation between the two coordinate systems.

Tracking fiducials can be difficult for the patient. For example, a high accuracy tends to be achieved by using bone-implanted fiducial markers, but less invasive techniques such as skin-attached markers or anatomical positions tend to be less accurate. Implantation of fiducials into a patient may be painful and difficult, especially for the C-spine. In fact, the implantation process frequently leads to clinical complications. Attempts have therefore been made to develop techniques for fiducial-less tracking.

By using anatomical structures, such as skeletal or vertebral structures, as reference points, the need for fiducial markers (and ensuing surgical implantation) may be reduced or eliminated in image-guided surgery. A fiducial-less tracking system and method, which relies on skeletal structures as references, may reduce the need for fiducial markers.

Typically, in a 2D-3D image registration, DRRs (digitally reconstructed radiographs) are reconstructed from the preoperative 3D images, after which image registration is performed between the DRRs and the real-time 2D projection images. Although fiducial-less tracking that relies on skeletal structures may overcome many of the drawbacks associated with implanted fiducials, these skeletal structures may not be easily visible in the pre-operative DRRs. Therefore, high quality DRR images can improve fiducial-less tracking techniques.

Furthermore, some or all of the above operations are typically implemented by software at the application level running on a central processing unit ("CPU"). The above operations may be sequentially performed by the software, which is relatively slow and time consuming.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for high quality volume rendering using a graphics processing unit ("GPU") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Use of Digitally Reconstructed Radiographs (DRR) During Radiosurgical Treatment

For a radiosurgical treatment of tumorous targets, the task of fiducial-less tracking is to predict patient target movement between pre-operative patient computed tomography ("CT") scanning and patient radiation treatment, based on the skeletal structures. The target movement may be tracked by comparing the pre-operative 3-dimensional ("3D") CT data and intra-operative x-ray 2-dimensional ("2D") projection images (e.g., a 2D/3D image registration). A basic problem in image registration is to find the optimal transformation that relates different representations or images of the same object. A 2D/3D registration, determines a projection mapping or transformation, from a 3D to a 2D coordinate system, such that points in each space which correspond to the same anatomical point are mapped to each other. In one embodiment, the transformation is represented, for example, by a set of non-rigid transformation parameters $(dx_T, dy_T, dz_T, r, p, w)$, where $(dx_T, dy_T, dz_T)$ represent the translations of an object, which may be a treatment target, and $(r, p, w)$ represent global rigid rotations of the target.

In one embodiment, two orthogonal x-ray projections are used to derive these six parameters set forth above. In this embodiment, the registration in each projection is performed individually and the results of the registration for each projection are subsequently combined to obtain the six 3D transformation parameters. In other embodiments, however, different projections or combinations thereof may be used to derive the transformation parameters.

Figure 1A:
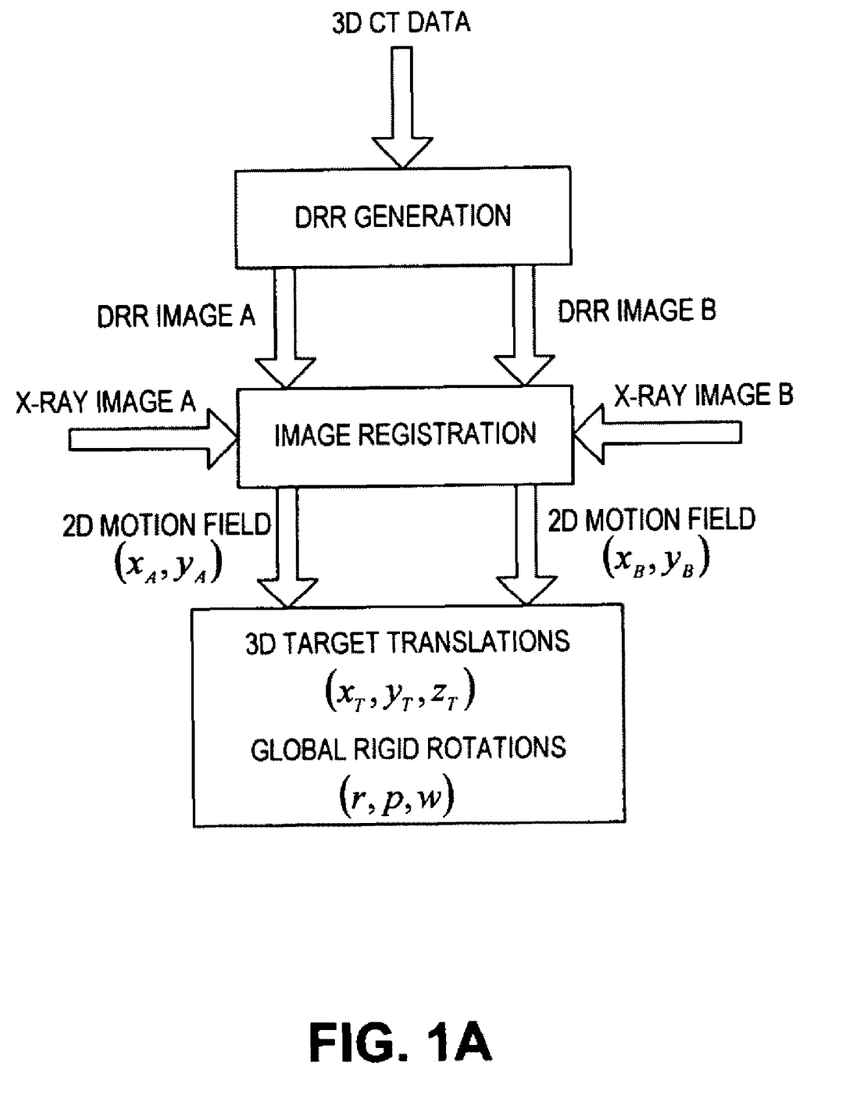
FIG. 1A is a functional block diagram illustrating a fiducial-less tracking system, in accordance with an embodiment of the invention.

FIG. 1A is a block diagram of a fiducial-less tracking system according to one embodiment. Referring to FIG. 1A, 2D-3D non-rigid image registration is performed for each of a pair of orthogonal projections A and B. For each projection, digitally reconstructed radiographs (DRRs) are first generated from the 3D CT scan data. As shown in FIG. 1A, the projection images A and B, acquired intra-operatively in near real time, are registered onto their respective DRRs. To determine a change in patient position and orientation between the time of the pre-operative CT scan and the time of radiosurgical treatment, local motion fields $(dx_A, dy_A)$ and $(dx_B, dy_B)$ are estimated in 2D, by using similarity measures to compare the pixel intensities in the x-ray images and the DRR images. A 3D motion field is derived from the 2D local motion fields. A full 3D motion field, derived from the local motion fields, includes 3D target translations $(dx_T, dy_T, dz_T)$ and global rigid rotations $(r, p, w)$, which are a set of non-rigid transformation parameters that represent the difference in the position and orientation of the treatment target, as shown in the projection images A and B, as compared to the position and orientation of the treatment target, as shown in the DRRs.

Figure 1B:
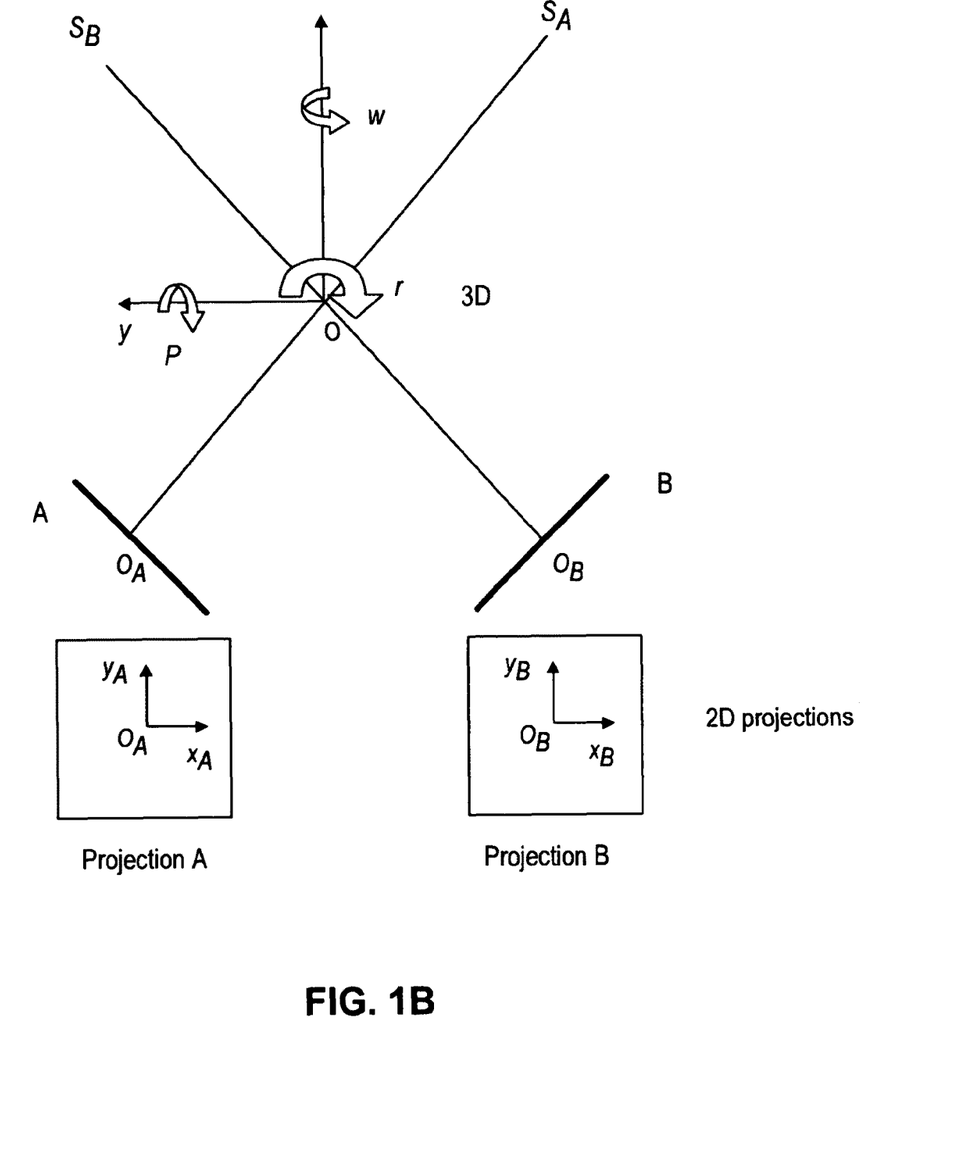
FIG. 1B is a diagram illustrating a fiducial-less tracking system, in accordance with an embodiment of the invention.

FIG. 1B is a block diagram illustrating geometric relations between a 3D treatment target and two orthogonal 2D x-ray projections during an image registration according to one embodiment. Referring to FIG. 1B, cameras (or image receivers) A and B receive their x-ray projections from respective x-ray sources (not shown). In a coordinate system of the 3D scan, the x-axis is directed inward into a paper (not shown in FIG. 1B). As explained above, the change in position of the treatment target is represented by three translations and three global rigid rotations (e.g., da, dy, dz, r, p, w).

Referring to FIG. 1B, the orthogonal 2D projections A and B are viewed from the directions $o_A s_A$ and $o_B s_B$ respectively. For each of the projections A and B, FIG. 1B illustrates respective 2D planar coordinate systems that are fixed with respect to an image plane that characterizes each projection. The image planes A and B for the projections A and B are thus defined by mutually orthogonal axes within the respective coordinate systems. These axes are shown as $(x_A, y_A)$ for projection A, and $(x_B, y_B)$ for projection B. The direction of the axis $x_A$ in the 2D coordinate system for projection A and the direction of the x-axis in the 3D scan coordinate system are opposite with respect to each other. The direction of axis $x_B$ in the coordinate system for projection B and the direction of the axis x in the 3D scan coordinate system are the same.

For projection A, the 2D motion field $(dx_A, dy_A)$ is estimated by registering the x-ray image projected onto the image plane A with the corresponding reference DRR image. For projection B, the 2D motion field $(dx_B, dy_B)$ is estimated by registering the x-ray image projected onto the image plane B with the corresponding reference DRR image. Given the 2D motion fields $(dx_A, dy_A)$ for projection A and $(dx_B, dy_B)$ for projection B, the 3D target translation $(dx_T, dy_T, dz_T)$ and the global rigid rotations $(r, p, w)$ can be obtained for both projections A and B by, for example, a straightforward mathematical operation.

Volume Rendering Using Ray Casting

Figure 2:
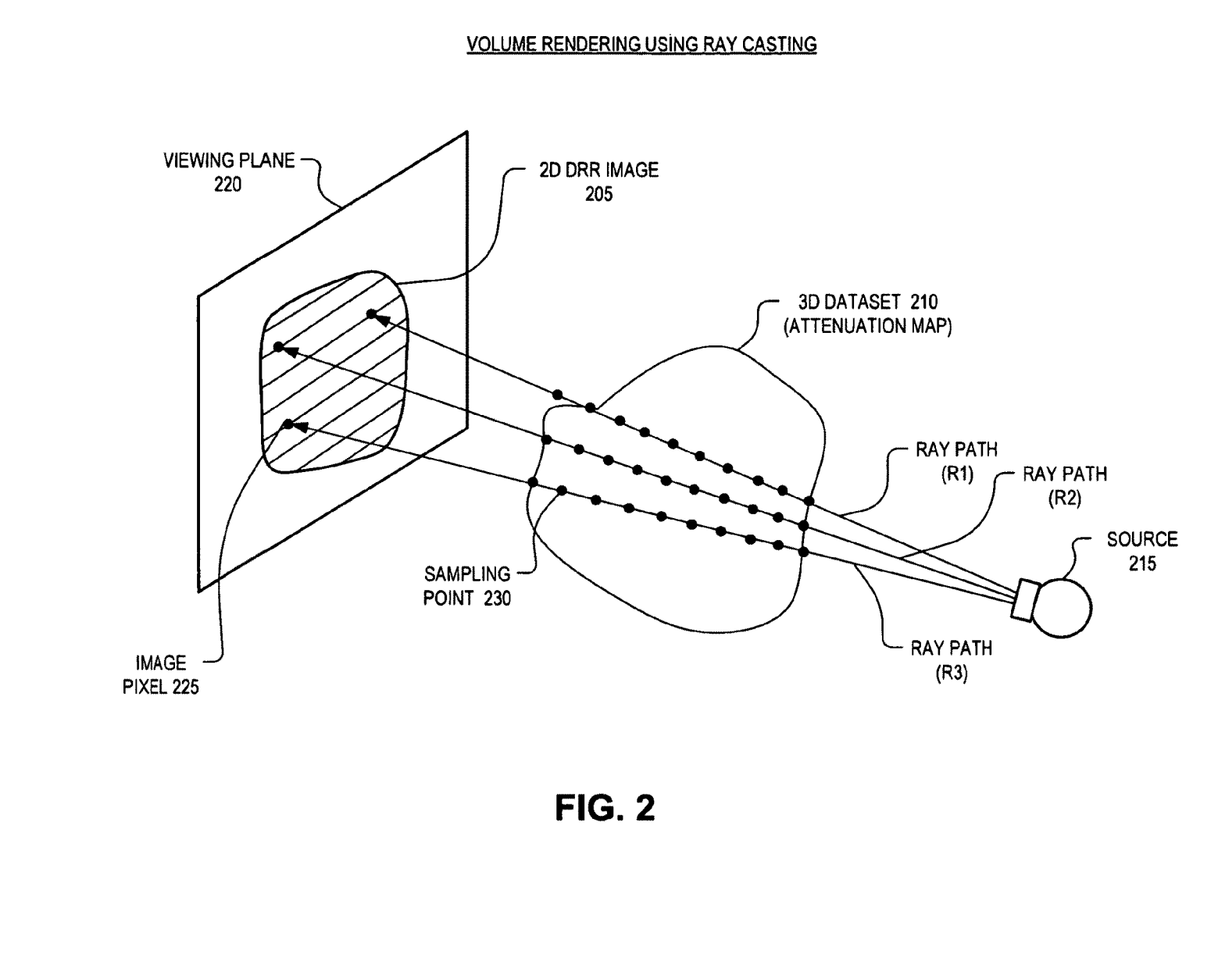
FIG. 2 is a diagram illustrating volume rendering using a ray casting technique to generate a digitally reconstructed radiograph ("DRR"), in accordance with an embodiment of the invention.

FIG. 2 is a diagram illustrating a technique of volume rendering using ray casting to generate a DRR image, in accordance with an embodiment of the invention. Volume rendering is a technique used to display a 2D projection of a 3D discretely sampled dataset. In the illustrated embodiment, the 2D projection is DRR image 205 and the 3D discretely sampled dataset is 3D dataset 210. In one embodiment, 3D dataset 210 is a collection of 2D diagnostic slice images of a patient anatomy acquired by a CT or MRI during treatment planning. 3D dataset 210 may be a volumetric grid of voxels with associated RGBA (red, green, blue, alpha) data. In one embodiment, 3D dataset 210 may not include RGB data, but rather be a 3D grid of attenuation values (a.k.a., 3D attenuation map). Each attenuation value may be a 16-bit value indicating the level of attenuation an x-ray passing through the corresponding location of the patient would experience. In one embodiment, 3D dataset 210 is a 512×512×220×16-bit data array.

DRR image 205 is generated by logically casting a series of rays (e.g., ray R1, R2, and R3) from a source point 215 through 3D dataset 210 onto a viewing plane 220. DRR image 205 is the shadow image generated by casting the rays. Each image pixel 225 within DRR image 205 is generated by an individual ray and is the result of the summation or integration of the attenuation values along the ray's trajectory or path through 3D dataset 210. The attenuation values are sampled at sampling points 230 along each ray trajectory. The sampling may be begin at either end of each ray path and continues in series along the ray trajectory through 3D dataset 210—a process referred to as "ray marching." The process of casting rays and marching each ray to compute an accumulated attenuation value is repeated for every image pixel 225 within DRR image 205.

Sampling points 230 may be separated by a regular sampling interval. By decreasing the size of the sampling interval (pitch between sampling points 230) a higher quality DRR image 205 may be generated, but at the expense of compute time and compute resources. Since 3D dataset 210 is typically composed of data values located at regular intervals, off axis sampling points 230 that do not fall on a regular interval, are sampled using data that is interpolated from surrounding data values.

In general, rendering speed of DRR image 205 and image quality are competing factors that often require tradeoff. Ray casting is a powerful volume rendering technique that can generate high quality DRR images, but can consume tremendous compute resources due to interpolation costs and small sampling intervals. Conventional ray casting techniques may be executed within a central processing unit ("CPU"). While CPU based ray casting may be capable of providing high quality DRR images, CPU architecture does not provide sufficient parallel compute resources for high speed real-time rendering. In contrast, conventional techniques that have relied upon the parallelism provided by a graphics processing unit ("GPU") pipeline to accelerate rendering have suffered from poor quality, low resolution images. This results from the default 8-bit rendering pipeline of conventional GPUs. The default rendering pipeline uses 8-bits for each channel of the (R, G, B, A) accumulated along a ray trajectory. 8-bits provide merely 256 levels of resolution. When generating high definition DRR images, a sampling interval resulting in 1000 to 2000 (or even more) sample points along a single ray trajectory may be used. If merely an 8-bit buffer is used to accumulate the attenuation values for each channel (R, G, B, A), the sampled values are scaled (commonly by a large number) to prevent buffer overflow. The scaling results in a blurred or degraded DRR image.

DRR Generation Using Multi-Stage Ray Marching

Figure 3:
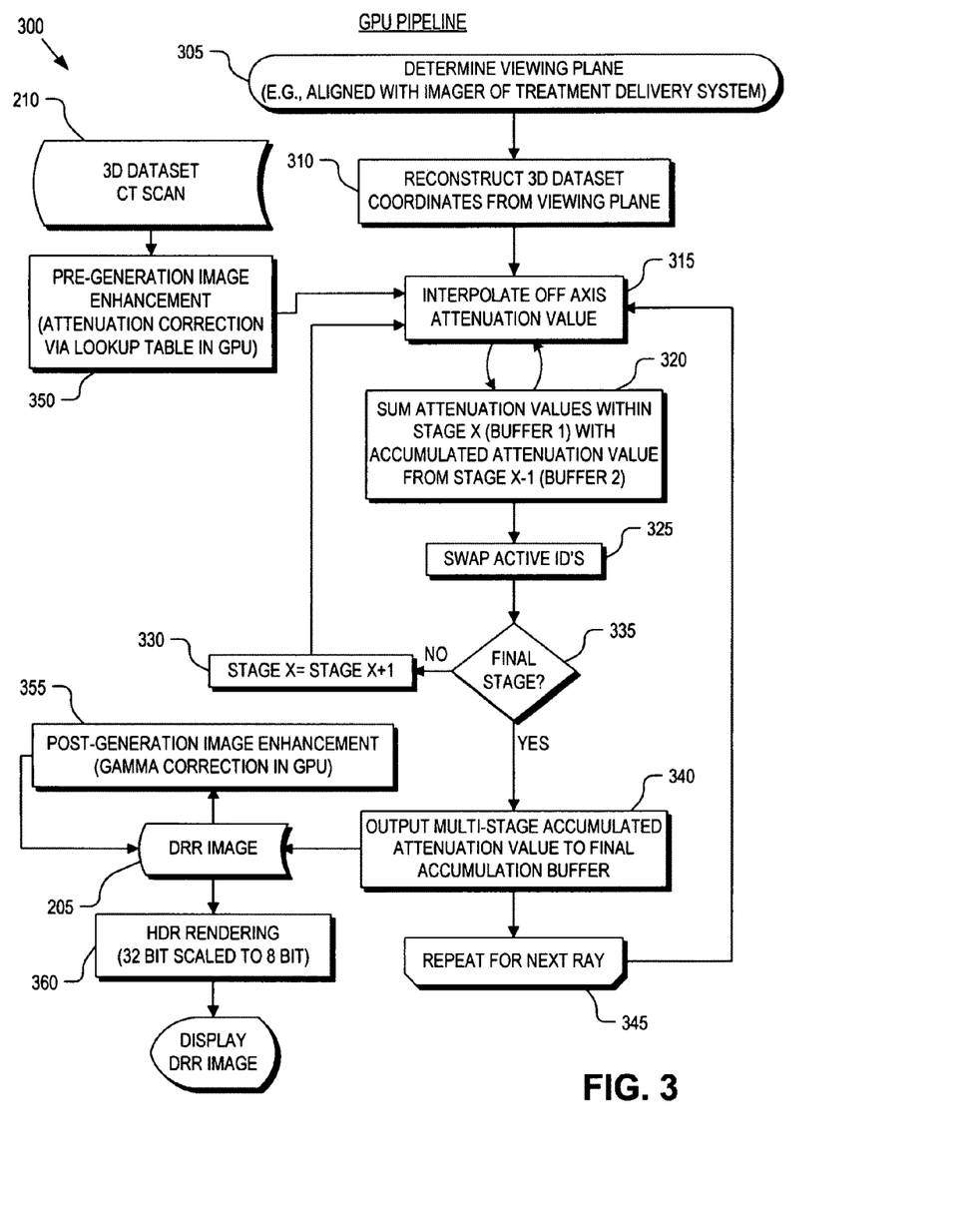
FIG. 3 is a flow chart illustrating a multi-stage ray marching technique for generating a DRR, in accordance with an embodiment of the invention.

FIG. 3 is a flow chart illustrating a process 300 describing a technique of multi-stage ray marching for generating DRR image 205, in accordance with an embodiment of the invention. The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

In a process block 305 viewing plane 220 is determined. In one embodiment, viewing plane 220 is selected to align with the position of imaging sources (e.g., imaging sources $302_1$, see FIG. 7) used during treatment delivery to view the intra-operative position of a target volume within a patient. Alignment with the imaging sources may include viewing plane 220 being aligned normal to a central ray path starting from the imaging source, passing through the target volume, and extending to a detector $302_2$ (see FIG. 7). Once viewing plane 220 has been selected, the coordinates of 3D dataset 210 may be reconstructed based on the selected viewing plane 220 (process block 310).

Although process 300 illustrates a technique for ray marching a single ray at a time, it should be appreciated that state of the art GPUs are capable of ray marching a plurality of rays in parallel using multi-instruction multi-data ("MIMD") techniques. For example, the GeForce 8800GTX includes a 128 stream processors, which can each be dedicated to process an individual channel (R, G, B, A) in parallel. In the example of the GeForce 8800GTX pipeline, four processors are dedicated to each ray, thereby enabling 32 rays to be marched in parallel.

Once viewing plane 220 has been selected and the coordinate system reconstructed relative to the selected viewing plane 220, ray marching can commence. If the current ray being marched falls off axis with 3D dataset 210, then interpolation is executed. In a process block 315, the attenuation values along the current ray trajectory are interpolated based on the adjacent attenuation values within 3D dataset 210. In process block 320, the attenuation values falling along the current ray trajectory at each sampling point 230 are summed or integrated using the multi-stage ray marching technique. The interpolation of off axis attenuation values may be performed on a per sample point basis in real-time as each sample point is sampled. Accordingly, the arrows between process blocks 315 and 320 illustrate a looping action.

Figure 4:
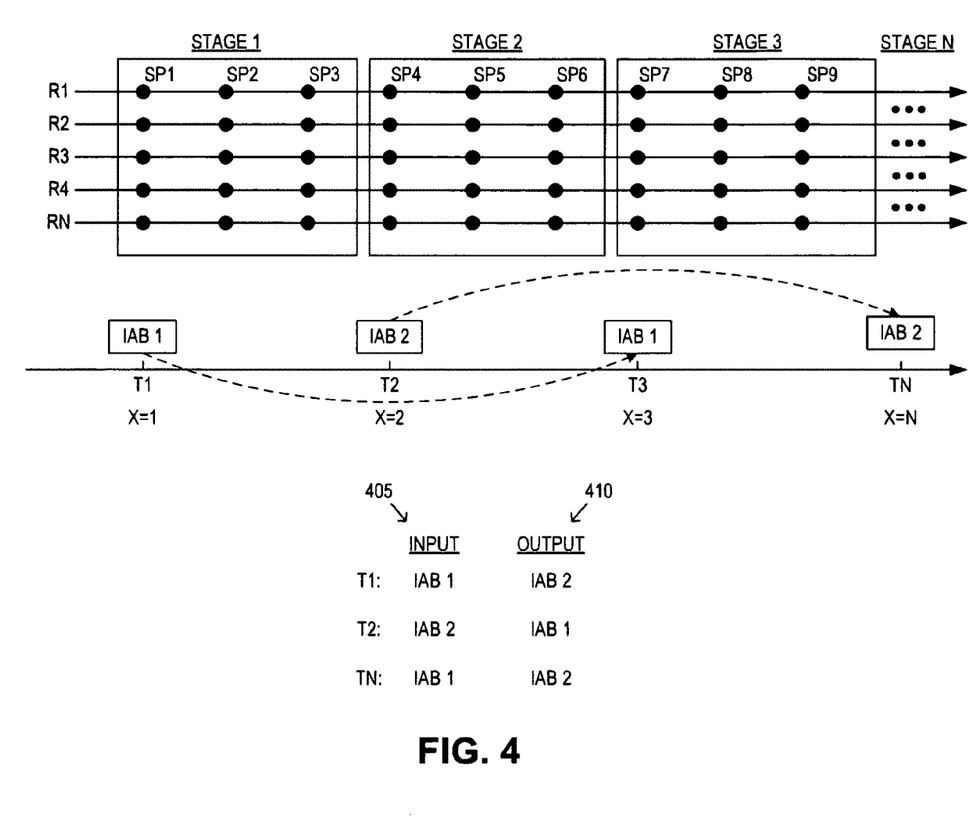
FIG. 4 is a diagram illustrating multi-stage ray marching, in accordance with an embodiment of the invention.

FIG. 4 is a diagram illustrating the multi-stage ray marching technique, in accordance with an embodiment of the invention. As illustrated in FIG. 4, the sampling points 230 (e.g., SP1, SP2 . . . SPN) of each ray trajectory (e.g., rays R1, R2 . . . RN) are divided into stages (e.g., stage 1, stage 2 . . . stage N). The attenuation values along a single ray at each sample point 230 within a given stage X are summed with an intermediate summation value from a previous stage X−1 and stored into an intermediate accumulation buffer ("IAB"). For example, starting at time T1 (X=1) the attenuation values at sample points SP1, SP2, and SP3 are summed within stage 1 and stored into IAB 1 as a first intermediate summation value. Starting at time T2 (X=2), the first intermediate summation value stored in IAB 1 is summed with the attenuation values at sample points SP4, SP5, and SP6 within stage 2 and stored into IAB 2 as a second intermediate summation value. At time T3 (X=3), IAB 1 is recycled and used to store the summation of the second intermediate summation value currently stored in IAB 2 with the attenuation values sampled at SP7, SP8, and SP9 of stage 3. This process continues until all sample points within all stages of the current ray trajectory are marched.

As each ray is marched, active identifiers ("IDs") 405 and 410 are assigned to IAB 1 and IAB 2 and reciprocally swapped from one stage to the next (process block 325). For example, at time T1, IAB 1 is designated as the "input buffer" into which the current stage summation is stored. At time T2 (X=2), IAB 1 is designated as the "output buffer" from which the previous stage (stage 1) intermediate summation value is retrieved and IAB 2 is designated as the "input buffer" into which the current stage (stage 2) summation is stored.

Until the final stage along a ray trajectory is reached, process 300 continues to loop back to process block 315, incrementing the current stage each time (process block 330). When the final stage along a ray trajectory is reached (decision block 335), a final accumulation value being representative of the total attenuation summed along the single ray trajectory is stored to a final accumulation buffer (process block 340). The final accumulation value is then used to generate a single pixel within DRR image 205 and process 300 loops back to process block 315 and repeats for the next ray trajectory (loop block 345). Once all ray trajectories have been marched and their corresponding pixels within DRR image 205 generated, DRR image 205 is fully generated.

Sampling points 230 along each ray trajectory are divided into stages to break up the task of summing the attenuation values for each ray into manageable sized tasks for fast computation via full hardware acceleration. The number of sample points 230 within each stage X is selected to prevent summing of the attenuation values and computation of the intermediate summation values from being executed via software emulation within the GPU. GPU pipelines are capable of computing the summations on a limited number of sample points 230 within hardware. If a GPU pipeline is used to sum more sample points than its hardware pipeline is capable of summing, then the GPU pipeline will revert to software emulation to complete the integral summation. Thus, by limiting the number of sample points 230 upon which each intermediate summation value is calculated prior to saving to an IAB, full hardware acceleration is retained for fast computation of the integral summation. The specific number of sample points within each stage X is dependent upon the specific GPU pipeline (e.g., 10 sample points per stage).

In order to generate high definition DRR images, the attenuation values are accumulated using 16-bit or 32-bit intermediate accumulation buffers to prevent buffer overflow without scaling. In one embodiment, floating point frame buffer objects ("FBOs"), (typically used for shading in game engines) are used to implement the IABs. Since two FBOs are used per ray trajectory, a total of 64 IABs are used to process 32 rays in parallel.

Figure 5A:
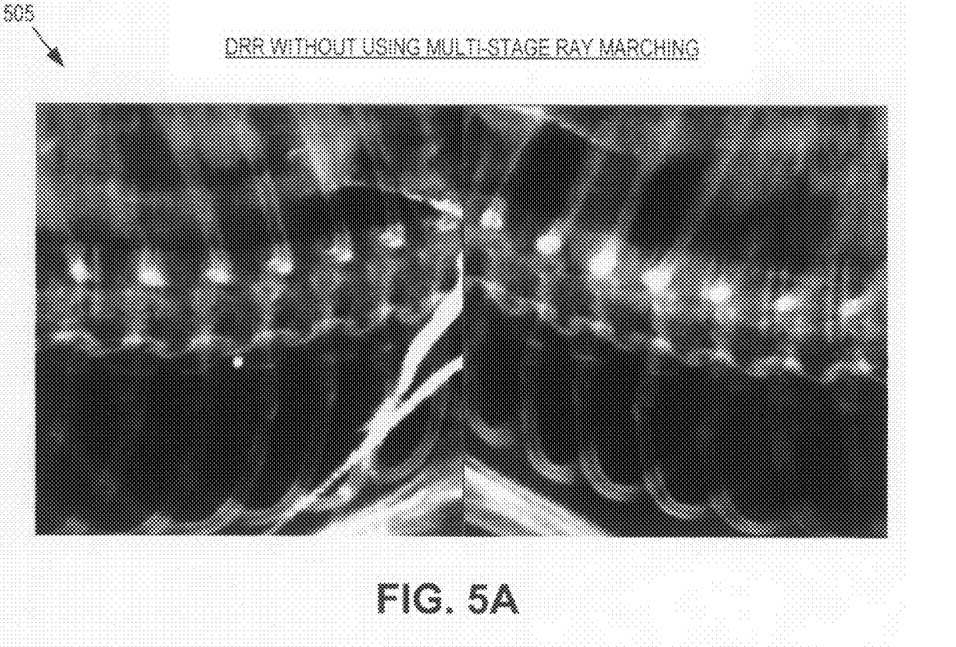
FIG. 5A is a diagram illustrating a DRR image generated without use of multi-stage ray marching.
Figure 5B:
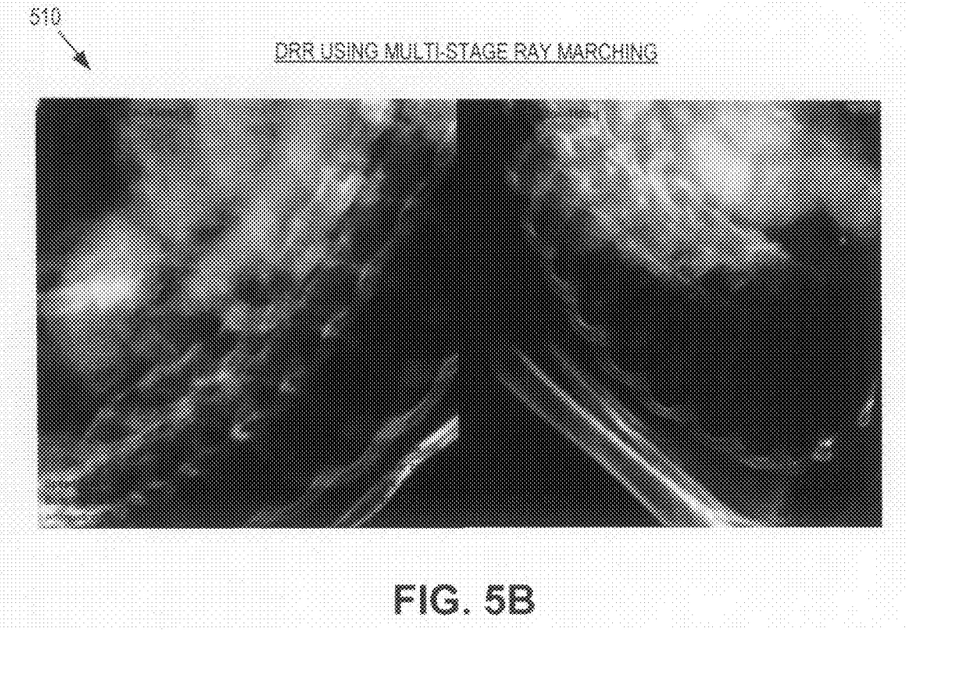
FIG. 5B is a diagram illustrating a DRR image generated using multi-stage ray marching, in accordance with an embodiment of the invention.

FIGS. 5A and 5B are comparative diagrams illustrating DRR images generated with and without multi-stage ray marching. FIG. 5A illustrates DRR images 505 generated without multi-stage ray marching, while FIG. 5B illustrates DRR images 510 generated using multi-stage ray marching according to process 300. As illustrated, DRR images 510 include greater definition of soft tissue due to the use of 16-bit or 32-bit IABs. As such, DRR images 510 provide greater accuracy for intra-operative tracking of soft tissue targets.

Returning to FIG. 3, pre-generation image enhancement and post-generation image enhancement may be performed on 3D dataset 210 and DRR image 205, respectively, within the GPU pipeline. In a process block 350, pre-generation image enhancement may be performed entirely within the GPU pipeline on each voxel of 3D dataset 210 prior to interpolation (process block 315) and summation (process block 320). Performing the pre-generation image enhancement within the GPU pipeline (as opposed to a CPU), leverages the MIMD parallel processing architecture of a GPU while also avoiding latency incurred by transporting the each attenuation value over the system bus between the GPU and the CPU. In one embodiment, the pre-generation image enhancement includes non-linear attenuation correction using a lookup table.

It should be appreciated that both the pre-generation image enhancement of process block 350 and the off axis attenuation value interpolation of process block 315 may be performed prior to ray marching 3D dataset 210 by generating a new enhanced, pre-interpolated 3D dataset. While generating an enhanced, pre-interpolated 3D dataset may marginally increase the speed of volume rendering, any such time savings will likely be lost in the time taken to generate the new enhanced, pre-interpolated 3D dataset. Furthermore, the additional 3D dataset will consume large memory resources.

In a process block 355, post-generation image enhancement may also be performed on DRR image 205 within the GPU pipeline. For example, the post-generation image enhancement may include execution of a gamma correction function on DRR image 205 entirely within the GPU pipeline (as opposed to within the CPU).

Once DRR image 205 has been generated and enhanced, DRR image 205 can be rendered to a screen using a high dynamic range ("HDR") rendering technique (process block 360). Rendering to a screen may include scaling the 16-bit or 32-bit accumulated attenuation values within DRR image 205 to an 8-bit value. However, it should be appreciated that rendering DRR image 205 to a screen may be used for viewing only, while the raw DRR image 205 is retained and can be directly used for high resolution image registration during intra-operative radiation treatment delivery. In some embodiments, the 32-bit DRR image 205 can be scaled to a 16-bit DRR image and this 16-bit DRR image dataset used for intra-operative image registration.

Figure 6:
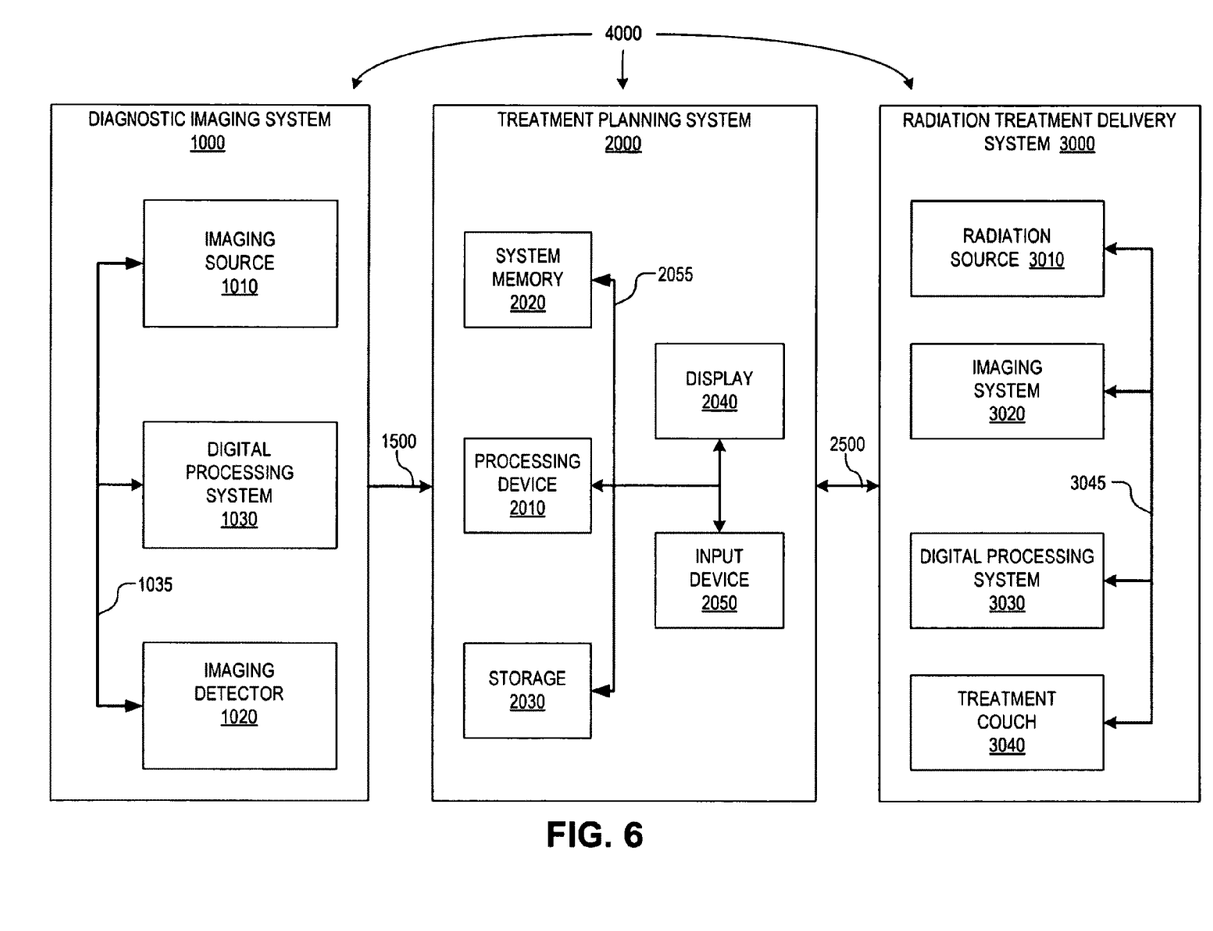
FIG. 6 is a block diagram illustrating a patient treatment system for generating diagnostic images, generating a treatment plan, and delivering the treatment plan, in accordance with an embodiment of the invention.

FIG. 6 is a block diagram illustrating a therapeutic patient treatment system 4000 for generating diagnostic images, generating a treatment plan, and delivering the treatment plan to a patient, in which features of the present invention may be implemented. As described below and illustrated in FIG. 6, systems 4000 may include a diagnostic imaging system 1000, a treatment planning system 2000 and a radiation delivery system 3000.

Diagnostic imaging system 1000 may be any system capable of producing medical diagnostic images of the VOI within a patient that may be used for subsequent medical diagnosis, treatment planning and/or treatment delivery. For example, diagnostic imaging system 1000 may be a computed tomography ("CT") system, a magnetic resonance imaging ("MRI") system, a positron emission tomography ("PET") system, an ultrasound system or the like. For ease of discussion, diagnostic imaging system 1000 may be discussed below at times in relation to a CT x-ray imaging modality. However, other imaging modalities such as those above may also be used. In one embodiment, diagnostic imaging system 1000 may be used to generate 3D dataset 210.

Diagnostic imaging system 1000 includes an imaging source 1010 to generate an imaging beam (e.g., x-rays, ultrasonic waves, radio frequency waves, etc.) and an imaging detector 1020 to detect and receive the beam generated by imaging source 1010, or a secondary beam or emission stimulated by the beam from the imaging source (e.g., in an MRI or PET scan). In one embodiment, diagnostic imaging system 1000 may include two or more diagnostic X-ray sources and two or more corresponding imaging detectors. For example, two x-ray sources may be disposed around a patient to be imaged, fixed at an angular separation from each other (e.g., 90 degrees, 45 degrees, etc.) and aimed through the patient toward (an) imaging detector(s) which may be diametrically opposed to the x-ray sources. A single large imaging detector, or multiple imaging detectors, can also be used that would be illuminated by each x-ray imaging source. Alternatively, other numbers and configurations of imaging sources and imaging detectors may be used.

The imaging source 1010 and the imaging detector 1020 are coupled to a digital processing system 1030 to control the imaging operation and process image data. Diagnostic imaging system 1000 includes a bus or other means 1035 for transferring data and commands among digital processing system 1030, imaging source 1010 and imaging detector 1020. Digital processing system 1030 may include one or more general-purpose processors (e.g., a microprocessor), special purpose processor such as a digital signal processor ("DSP") or other type of device such as a controller or field programmable gate array ("FPGA"). Digital processing system 1030 may also include other components (not shown) such as memory, storage devices, network adapters and the like. Digital processing system 1030 may be configured to generate digital diagnostic images in a standard format, such as the DICOM (Digital Imaging and Communications in Medicine) format, for example. In other embodiments, digital processing system 1030 may generate other standard or non-standard digital image formats. Digital processing system 1030 may transmit diagnostic image files (e.g., the aforementioned DICOM formatted files) to treatment planning system 2000 over a data link 1500, which may be, for example, a direct link, a local area network ("LAN") link or a wide area network ("WAN") link such as the Internet. In addition, the information transferred between systems may either be pulled or pushed across the communication medium connecting the systems, such as in a remote diagnosis or treatment planning configuration. In remote diagnosis or treatment planning, a user may utilize embodiments of the present invention to diagnose or treatment plan despite the existence of a physical separation between the system user and the patient.

Treatment planning system 2000 includes a processing device 2010 to receive and process image data. Processing device 2010 may represent one or more general-purpose processors (e.g., a microprocessor), special purpose processor such as a DSP or other type of device such as a controller or FPGA. Processing device 2010 may be configured to execute instructions for performing treatment planning operations discussed herein.

Treatment planning system 2000 may also include system memory 2020 that may include a random access memory ("RAM"), or other dynamic storage devices, coupled to processing device 2010 by bus 2055, for storing information and instructions to be executed by processing device 2010. System memory 2020 also may be used for storing temporary variables or other intermediate information during execution of instructions by processing device 2010. System memory 2020 may also include a read only memory ("ROM") and/or other static storage device coupled to bus 2055 for storing static information and instructions for processing device 2010.

Treatment planning system 2000 may also include storage device 2030, representing one or more storage devices (e.g., a magnetic disk drive or optical disk drive) coupled to bus 2055 for storing information and instructions. Storage device 2030 may be used for storing instructions for performing the treatment planning steps discussed herein.

Processing device 2010 may also be coupled to a display device 2040, such as a cathode ray tube ("CRT") or liquid crystal display ("LCD"), for displaying information (e.g., a 2D or 3D representation of the VOI) to the user. An input device 2050, such as a keyboard, may be coupled to processing device 2010 for communicating information and/or command selections to processing device 2010. One or more other user input devices (e.g., a mouse, a trackball or cursor direction keys) may also be used to communicate directional information, to select commands for processing device 2010 and to control cursor movements on display 2040.

It will be appreciated that treatment planning system 2000 represents only one example of a treatment planning system, which may have many different configurations and architectures, which may include more components or fewer components than treatment planning system 2000 and which may be employed with the present invention. For example, some systems often have multiple buses, such as a peripheral bus, a dedicated cache bus, etc. The treatment planning system 2000 may also include MIRIT (Medical Image Review and Import Tool) to support DICOM import (so images can be fused and targets delineated on different systems and then imported into the treatment planning system for planning and dose calculations), expanded image fusion capabilities that allow the user to treatment plan and view dose distributions on any one of various imaging modalities (e.g., MRI, CT, PET, etc.). Treatment planning systems are known in the art; accordingly, a more detailed discussion is not provided.

Treatment planning system 2000 may share its database (e.g., data stored in storage device 2030) with a treatment delivery system, such as radiation treatment delivery system 3000, so that it may not be necessary to export from the treatment planning system prior to treatment delivery. Treatment planning system 2000 may be linked to radiation treatment delivery system 3000 via a data link 2500, which may be a direct link, a LAN link or a WAN link as discussed above with respect to data link 1500. It should be noted that when data links 1500 and 2500 are implemented as LAN or WAN connections, any of diagnostic imaging system 1000, treatment planning system 2000 and/or radiation treatment delivery system 3000 may be in decentralized locations such that the systems may be physically remote from each other. Alternatively, any of diagnostic imaging system 1000, treatment planning system 2000 and/or radiation treatment delivery system 3000 may be integrated with each other in one or more systems.

Radiation treatment delivery system 3000 includes a therapeutic and/or surgical radiation source 3010 to administer a prescribed radiation dose to a target volume in conformance with a treatment plan. Radiation treatment delivery system 3000 may also include an imaging system 3020 (including imaging sources 3021 and detectors 3022, see FIG. 7) to capture inter-treatment images of a patient volume (including the target volume) for registration or correlation with the diagnostic images (e.g., DRR image 205) described above in order to position the patient with respect to the radiation source. Radiation treatment delivery system 3000 may also include a digital processing system 3030 to control radiation source 3010, imaging system 3020, and a patient support device such as a treatment couch 3040. Digital processing system 3030 may include one or more general-purpose processors (e.g., a microprocessor), special purpose processor such as a DSP or other type of device such as a controller or FPGA. Digital processing system 3030 may also include other components (not shown) such as memory, storage devices, network adapters and the like. Digital processing system 3030 may be coupled to radiation source 3010, imaging system 3020 and treatment couch 3040 by a bus 3045 or other type of control and communication interface.

Figure 7:
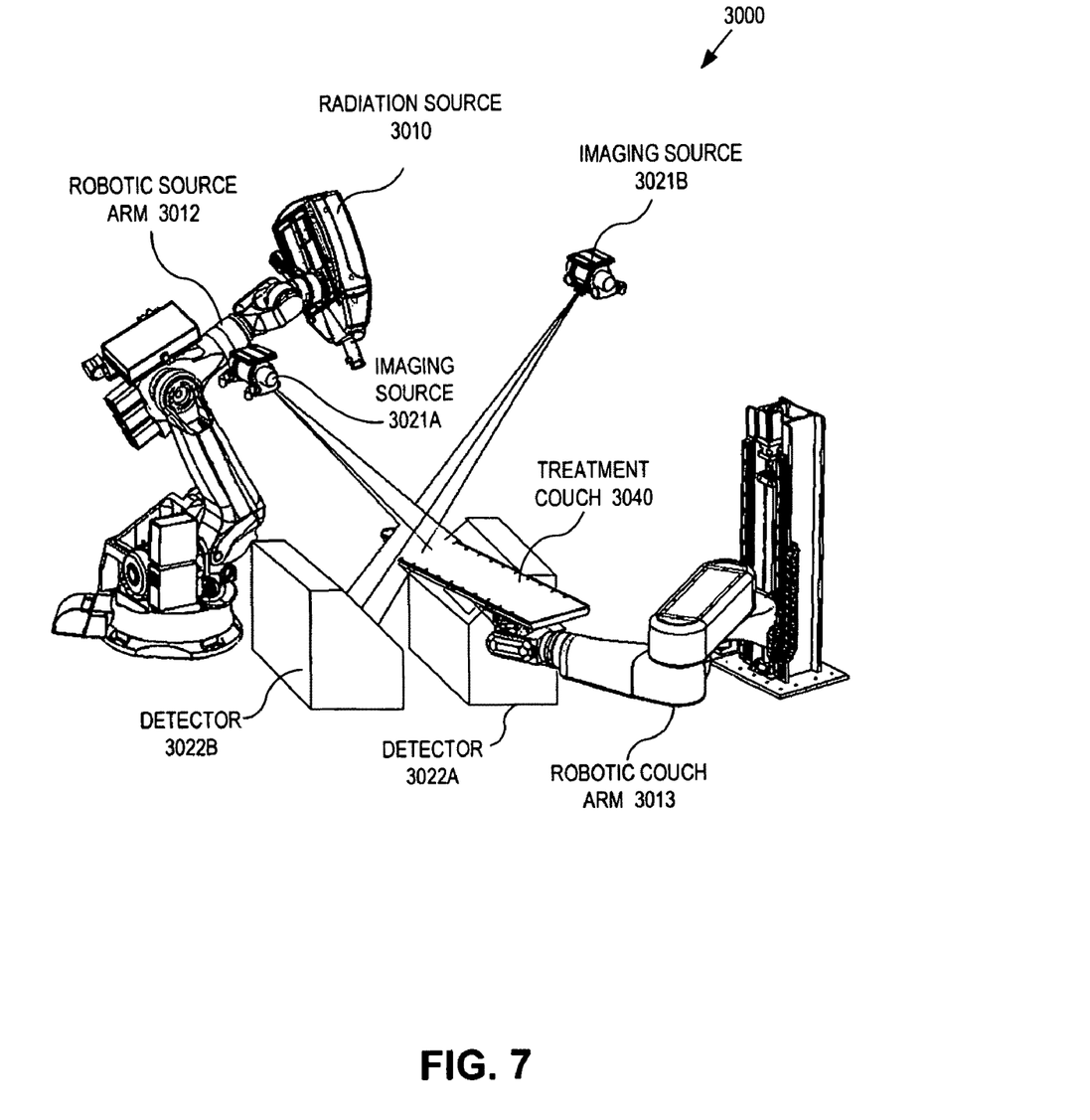
FIG. 7 is a perspective view of a radiation treatment delivery system, in accordance with an embodiment of the invention.

FIG. 7 is a perspective view of a radiation delivery system 3000, in accordance with an embodiment of the invention. In one embodiment, radiation treatment delivery system 3000 may be an image-guided, robotic-based radiation treatment system such as the CyberKnife® system developed by Accuray, Inc. of California. In FIG. 7, radiation source 3010 may be a linear accelerator ("LINAC") mounted on the end of a source positioning system 3012 (e.g., robotic arm) having multiple (e.g., 5 or more) degrees of freedom in order to position the LINAC to irradiate a pathological anatomy (target region or volume) with beams delivered from many angles in an operating volume (e.g., a sphere) around the patient. Treatment may involve beam paths with a single isocenter (point of convergence), multiple isocenters, or with a non-isocentric approach (i.e., the beams need only intersect with the pathological target volume and do not necessarily converge on a single point, or isocenter, within the target). Treatment can be delivered in either a single session (mono-fraction) or in a small number of sessions (hypo-fractionation) as determined during treatment planning. With radiation treatment delivery system 3000, in one embodiment, radiation beams may be delivered according to the treatment plan without fixing the patient to a rigid, external frame to register the intra-operative position of the target volume with the position of the target volume during the pre-operative treatment planning phase.

Imaging system 3020 (see FIG. 6) may be represented by imaging sources 3021A and 3021B and imaging detectors (imagers) 3022A and 3022B in FIG. 7. In one embodiment, imaging sources 3021A and 3021B are X-ray sources. In one embodiment, for example, two imaging sources 3021A and 3021B may be nominally aligned to project imaging x-ray beams through a patient from two different angular positions (e.g., separated by 90 degrees, 45 degrees, etc.) and aimed through the patient on treatment couch 3040 toward respective detectors 3022A and 3022B. In another embodiment, a single large imager can be used that would be illuminated by each x-ray imaging source. Alternatively, other numbers and configurations of imaging sources and detectors may be used.

Digital processing system 3030 may implement algorithms to register images obtained from imaging system 3020 with pre-operative treatment planning images (e.g., DRR image 205) in order to align the patient on the treatment couch 3040 within radiation treatment delivery system 3000, and to precisely position radiation source 3010 with respect to the target volume.

In the illustrated embodiment, treatment couch 3040 is coupled to a couch positioning system 3013 (e.g., robotic couch arm) having multiple (e.g., 5 or more) degrees of freedom. Couch positioning system 3013 may have five rotational degrees of freedom and one substantially vertical, linear degree of freedom. Alternatively, couch positioning system 3013 may have six rotational degrees of freedom and one substantially vertical, linear degree of freedom or at least four rotational degrees of freedom. Couch positioning system 3013 may be vertically mounted to a column or wall, or horizontally mounted to pedestal, floor, or ceiling. Alternatively, treatment couch 3040 may be a component of another mechanical mechanism, such as the Axum™ treatment couch developed by Accuray, Inc. of California, or be another type of conventional treatment table known to those of ordinary skill in the art.

Alternatively, radiation treatment delivery system 3000 may be another type of treatment delivery system, for example, a gantry based (isocentric) intensity modulated radiotherapy ("IMRT") system or 3D conformal radiation treatments. In a gantry based system, a therapeutic radiation source (e.g., a LINAC) is mounted on the gantry in such a way that it rotates in a plane corresponding to an axial slice of the patient. Radiation is then delivered from several positions on the circular plane of rotation. In IMRT, the shape of the radiation beam is defined by a multi-leaf collimator that allows portions of the beam to be blocked, so that the remaining beam incident on the patient has a pre-defined shape. The resulting system generates arbitrarily shaped radiation beams that intersect each other at the isocenter to deliver a dose distribution to the target. In IMRT planning, the optimization algorithm selects subsets of the main beam and determines the amount of time that the patient should be exposed to each subset, so that the prescribed dose constraints are best met.

It should be noted that the methods and apparatus described herein are not limited to use only with medical diagnostic imaging and treatment. In alternative embodiments, the methods and apparatus herein may be used in applications outside of the medical technology field, such as industrial imaging and non-destructive testing of materials (e.g., motor blocks in the automotive industry, airframes in the aviation industry, welds in the construction industry and drill cores in the petroleum industry) and seismic surveying. In such applications, for example, "treatment" may refer generally to the application of radiation beam(s).

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (e.g., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method for generating a DRR (digitally reconstructed radiography) image, the method comprising:
    summing attenuation values along a ray trajectory through a 3-dimensional dataset of attenuation values to generate a final accumulation value representative of a total attenuation summed along the ray trajectory;
    computing intermediate summation values in stages along the ray trajectory, wherein each of the stages includes a subset of the attenuation values and wherein for each of the stages the attenuation values summed within a given stage are summed with a previous stage intermediate summation value calculated for a stage previous to the given stage to generate a given stage intermediate summation value; and
    generating the digitally reconstructed radiography image.

2. The method of claim 1, wherein summing the attenuation values along the ray trajectory through the 3-dimensional dataset of attenuation values comprises:
    dividing sample points along the ray trajectory through the 3-dimensional dataset into the stages with each of the stages including a plurality of the sample points; and
    summing the attenuation values at each of the sample points along the ray trajectory.

3. The method of claim 1, wherein computing the intermediate summation values for each of the stages along the ray trajectory further comprises:
    storing the previous stage intermediate summation value to a first intermediate accumulation buffer; and
    storing the given stage intermediate summation value to a second accumulation buffer.

4. The method of claim 3, wherein the first and second intermediate accumulation buffers comprise floating point frame buffer objects of a graphics processing unit.

5. The method of claim 3, wherein the first and second intermediate accumulation buffers comprise 32-bit buffers within a graphics processing unit.

6. The method of claim 3, wherein the first and second intermediate accumulation buffers comprise 16-bit buffers within a graphics processing unit.

7. The method of claim 3, wherein the attenuation values comprise 16-bit attenuation values determined from one or more computed tomography scans.

8. The method of claim 3, further comprising recycling the first and second accumulation buffers to reciprocally store the intermediate summation values between the first and second accumulation buffers as the intermediate summation values are computed along the ray trajectory.

9. The method of claim 8, wherein recycling the first and second accumulation buffers comprising:
    assigning a first active identifier ("ID") of the first intermediate accumulation buffer as an input buffer;
    assigning a second active ID of the second intermediate accumulation buffer as an output buffer; and
    reciprocally swapping the first and second active IDs as the intermediate summation values are computed along the ray trajectory.

10. The method of claim 1, wherein summing the attenuation values and computing the intermediate summation values are executed within a graphics processing unit ("GPU") of a computing system.

11. The method of claim 10, wherein a number of the sampling points within each of the stages is selected to prevent summing the attenuation values and computing the intermediate summation values from being executed via software emulation within the GPU.

12. The method of claim 10, further comprising performing image enhancement correction within the GPU on each of the sample points prior to summing the attenuation values and prior to computing the intermediate summation values.

13. The method of claim 10, further comprising generating a pixel within the DRR based on the final accumulation value.

14. The method of claim 13, further comprising generating a 2-dimensional array of pixels for the DRR based on a plurality of final accumulation values calculated along a corresponding plurality of ray trajectories through the 3-dimensional dataset.

15. The method of claim 14, further comprising performing image enhancement correction within the GPU on the DRR after generation of the DRR.

16. The method of claim 14, further comprising:
obtaining a real-time 2-dimensional projection image of a patient;
registering the 2-dimensional projection image to the DRR image; and
delivering a prescribed dose of radiation to the patient.

17. The method of claim 14, further comprising:
obtaining a real-time 2-dimensional projection image of a volume of interest;
registering the 2-dimensional projection image to the DRR image; and
tracking translational and rotational movement of the volume of interest based on a comparison of the 2-dimensional projection image with the DRR image.

18. A machine-accessible storage medium that stores instructions that, if executed by a machine, will cause the machine to perform a method for generating a DRR (digitally reconstructed radiography) image, the method comprising:
summing attenuation values along a ray trajectory through a 3-dimensional dataset of attenuation values at sample points along the ray trajectory;
computing intermediate summation values for stages along the ray trajectory, wherein each of the stages includes a subset of the sample points, wherein for each of the stages the attenuation values summed within a given stage are summed with a previous stage intermediate summation value calculated for a stage previous to the given stage to generate a given stage intermediate summation value;
generating a final accumulation value representative of a total attenuation summed along the ray trajectory; and
generating the digitally reconstructed radiography image.

19. The machine-accessible storage medium of claim 18, wherein computing the intermediate summation values for each of the stages along the ray trajectory further comprises:
storing the previous stage intermediate summation value to a first intermediate accumulation buffer; and
storing the given stage intermediate summation value to a second accumulation buffer.

20. The machine-accessible storage medium of claim 19, wherein the first and second intermediate accumulation buffers comprise frame buffer objects of a graphics processing unit.

21. The machine-accessible storage medium of claim 19, wherein the first and second intermediate accumulation buffers comprise 32-bit buffers within a graphics processing unit.

22. The machine-accessible storage medium of claim 19, wherein the first and second intermediate accumulation buffers comprise 16-bit buffers within a graphics processing unit.

23. The machine-accessible storage medium of claim 19, further storing instructions that, if executed by the machine, will cause the machine to perform further operations, comprising:
recycling the first and second accumulation buffers to reciprocally store the intermediate summation values between the first and second accumulation buffers as the intermediate summation values are computed along the ray trajectory.

24. The machine-accessible storage medium of claim 23, wherein reusing the first and second accumulation buffers comprising:
assigning a first active identifier ("ID") of the first intermediate accumulation buffer as an input buffer;
assigning a second active ID of the second intermediate accumulation buffer as an output buffer; and
reciprocally swapping the first and second active IDs as the intermediate summation values are computed along the ray trajectory.

25. The machine-accessible storage medium of claim 18, wherein summing the attenuation values and computing the intermediate summation values are executed within a graphics processing unit ("GPU") of a computing system.

26. The machine-accessible storage medium of claim 25, wherein a number of the sampling points within each of the stages is selected to prevent summing the attenuation values and computing the intermediate summation values from being executed via software emulation within the GPU.

27. The machine-accessible storage medium of claim 25, further storing instructions that, if executed by the machine, will cause the machine to perform further operations, comprising:
performing image enhancement correction within the GPU on each of the sample points prior to summing the attenuation values and prior to computing the intermediate summation values.

28. The machine-accessible storage medium of claim 25, further storing instructions that, if executed by the machine, will cause the machine to perform further operations, comprising:
generating a pixel within the DRR based on the final accumulation value.

29. The machine-accessible storage medium of claim 28, further storing instructions that, if executed by the machine, will cause the machine to perform further operations, comprising:
generating a 2-dimensional array of pixels for the DRR based on a plurality of final accumulation values calculated along a corresponding plurality of ray trajectories through the 3-dimensional dataset.

30. The machine-accessible storage medium of claim 29, further storing instructions that, if executed by the machine, will cause the machine to perform further operations, comprising:
performing image enhancement correction within the GPU on the DRR after generation of the DRR.

31. An apparatus for generating a DRR (digitally reconstructed radiography) image, comprising:
means for summing attenuation values along a ray trajectory through a 3-dimensional dataset of attenuation values at sample points along the ray trajectory to generate a final accumulation value representative of a total attenuation summed along the ray trajectory; and
means for computing intermediate summation values for stages along the ray trajectory, wherein each of the stages includes a plurality of the sample points, wherein for each of the stages the attenuation values summed within a given stage are summed with a previous stage intermediate summation value calculated for a stage previous to the given stage to generate a given stage intermediate summation value; and means for generating the digitally reconstructed radiography image.

32. The apparatus of claim 31, wherein the means for computing the intermediate summation values for stages along the ray trajectory comprises means for computing M-bit intermediate summation values by summing N-bit attenuation values in the stages, where N is less than M.

33. The apparatus of claim 32, wherein the means for computing the M-bit intermediate summation values comprises a means for computing the M-bit intermediate summation values without scaling the M-bit intermediate summation values.

34. The apparatus of claim 32, wherein M equals 16-bits or 32-bits and N equals 8-bits.

35. The apparatus of claim 31, wherein the means for computing the intermediate summation values for the stages along the ray trajectory comprises:
first means for storing the previous stage intermediate summation value; and second means for storing the given stage intermediate summation value.

36. The apparatus of claim 35, further comprising means for recycling the first and second means for storing to reciprocally store the intermediate summation values between the first and second means for storing as the intermediate summation values are computed along the ray trajectory.

37. The apparatus of claim 31, wherein the means for summing attenuation values, the means for computing intermediate summation values, and the means for generating a final accumulation value comprise elements of a graphics processing unit ("GPU") pipeline.

38. The apparatus of claim 37, wherein a number of the sampling points within each of the stages is selected to prevent software emulation of the means for summing the attenuation values and the means for computing the intermediate summation values.

39. The apparatus of claim 37, further comprising means for performing image enhancement correction within the GPU pipeline on each of the sample points prior to summing the attenuation values and prior to computing the intermediate summation values.

40. The apparatus of claim 37, further comprising means for generating a pixel within the DRR based on the final accumulation value.

41. The apparatus of claim 40, further comprising means for generating a 2-dimensional array of pixels for the DRR based on a plurality of final accumulation values calculated along a corresponding plurality of ray trajectories through the 3-dimensional dataset.

42. The apparatus of claim 41, further comprising means for performing image enhancement correction within the GPU pipeline on the DRR after generation of the DRR.

43. A data processing system, comprising:
a processor; and
a graphics device coupled to the processor, the graphics device including a plurality of parallel processing engines and memory to store instructions when executed by the processing engines will cause the graphics device to:
sum attenuation values along a ray trajectory through a 3-dimensional dataset of attenuation values at sample points along the ray trajectory;
compute intermediate summation values for stages along the ray trajectory, wherein each of the stages includes a plurality of the sample points, wherein for each of the stages the attenuation values summed within a given stage are summed with a previous stage intermediate summation value calculated for a stage previous to the given stage to generate a given stage intermediate summation value;
generate a final accumulation value representative of a total attenuation summed along the ray trajectory; and
generate a pixel of a digitally reconstructed radiography ("DRR") image based on the final accumulation value.

44. The data processing system of claim 43, wherein the graphics device includes a first intermediate accumulation buffer and a second intermediate accumulation buffer for temporarily storing the intermediate summation values.

45. The data processing system of claim 44, wherein computing the intermediate summation values for each of the stages along the ray trajectory further comprises:
storing the previous stage intermediate summation value to the first intermediate accumulation buffer; and
storing the given stage intermediate summation value to the second accumulation buffer.

46. The data processing system of claim 44, wherein the first and second intermediate accumulation buffers comprise frame buffer objects of the graphics device.

47. The data processing system of claim 46, wherein the first and second intermediate accumulation buffers further comprise 32-bit floating point buffers.

48. The data processing system of claim 44, wherein the memory further provides instructions that, if executed by the parallel processing engines, will cause the graphics device to perform further operations, comprising:
recycling the first and second accumulation buffers to reciprocally store the intermediate summation values between the first and second accumulation buffers as the intermediate summation values are computed along the ray trajectory.

49. The data processing system of claim 43, wherein a number of the sampling points within each of the stages is selected to prevent summing the attenuation values and computing the intermediate summation values from being executed via software emulation within the graphics device.

50. The data processing system of claim 43, wherein the memory further provides instructions that, if executed by the parallel processing engines, will cause the graphics device to perform further operations, comprising: generating a 2-dimensional array of pixels for the DRR image based on a plurality of final accumulation values calculated along a corresponding plurality of ray trajectories through the 3-dimensional dataset.

* * * * *